(12) United States Patent
Haub et al.

(10) Patent No.: US 7,819,464 B2
(45) Date of Patent: Oct. 26, 2010

(54) TRAILER, WALL CONSTRUCTION AND MANUFACTURING METHOD

(75) Inventors: Gregory D. Haub, Douglas, OK (US);
Brian S Hinrichs, Enid, OK (US); Chris D. Bartel, Fairview, OK (US); Jesse K. Davis, Fairview, OK (US)

(73) Assignee: Blue Tee Corporation, Enid, OK (US)

( * ) Notice: Subject to any disclaimer, the term of this patent is extended or adjusted under 35 U.S.C. 154(b) by 279 days.

(21) Appl. No.: 12/104,276

(22) Filed: Apr. 16, 2008

(65) Prior Publication Data

US 2009/0260305 A1    Oct. 22, 2009

(51) Int. Cl.
*B60N 99/00* (2006.01)
(52) U.S. Cl. .................. 296/186.1; 296/182.1
(58) Field of Classification Search ............ 296/182.1, 296/186.1, 186.3; 52/281, 592.1, 284, 745.19
See application file for complete search history.

(56) References Cited

U.S. PATENT DOCUMENTS

| 5,791,726 | A  | * | 8/1998  | Kaufman ............. 296/182.1 |
| 5,820,192 | A  |   | 10/1998 | Yarnavick |
| 6,425,626 | B1 |   | 7/2002  | Kloepfer |
| 6,513,297 | B2 |   | 2/2003  | Kloepfer |
| 6,669,271 | B2 |   | 12/2003 | Booher |
| 6,688,673 | B2 |   | 2/2004  | Kloepfer |
| 6,719,360 | B1 |   | 4/2004  | Backs |
| 6,729,816 | B2 |   | 5/2004  | Booher |
| 6,854,789 | B2 |   | 2/2005  | Kloepfer |
| 6,929,311 | B2 |   | 8/2005  | Booher |
| 7,014,252 | B2 |   | 3/2006  | Booher |
| 7,100,972 | B2 |   | 9/2006  | Booher |
| 7,152,909 | B2 |   | 12/2006 | Booher |
| 2002/0041112 | A1 | * | 4/2002 | Foster et al. ............ 296/181 |
| 2005/0248183 | A1 |   | 11/2005 | Booher |
| 2005/0264035 | A1 |   | 12/2005 | Booher |

\* cited by examiner

*Primary Examiner*—Lori L Lyjak
(74) *Attorney, Agent, or Firm*—Mark E. Brown

(57) ABSTRACT

A trailer includes a bed with a floor structure and a superstructure mounted on the bed. The superstructure includes a wall construction of wall sections with interconnected tongue-and-groove edges and wall section ends. Corner posts include channels receiving the wall section ends for forming corners of the superstructure. A top rail forms a rim of the superstructure and receives the top-most wall sections. A rub rail connects the walls to the floor structure and receives the bottom-most wall sections. A method of manufacturing a trailer includes the steps of providing a bed with a floor structure and forming a superstructure from wall sections by interconnecting their tongue-and-groove edges. The trailer can be configured for a moving floor, a tipping mechanism or an ejector mechanism for discharging and/or loading materials and cargo in an interior.

19 Claims, 10 Drawing Sheets

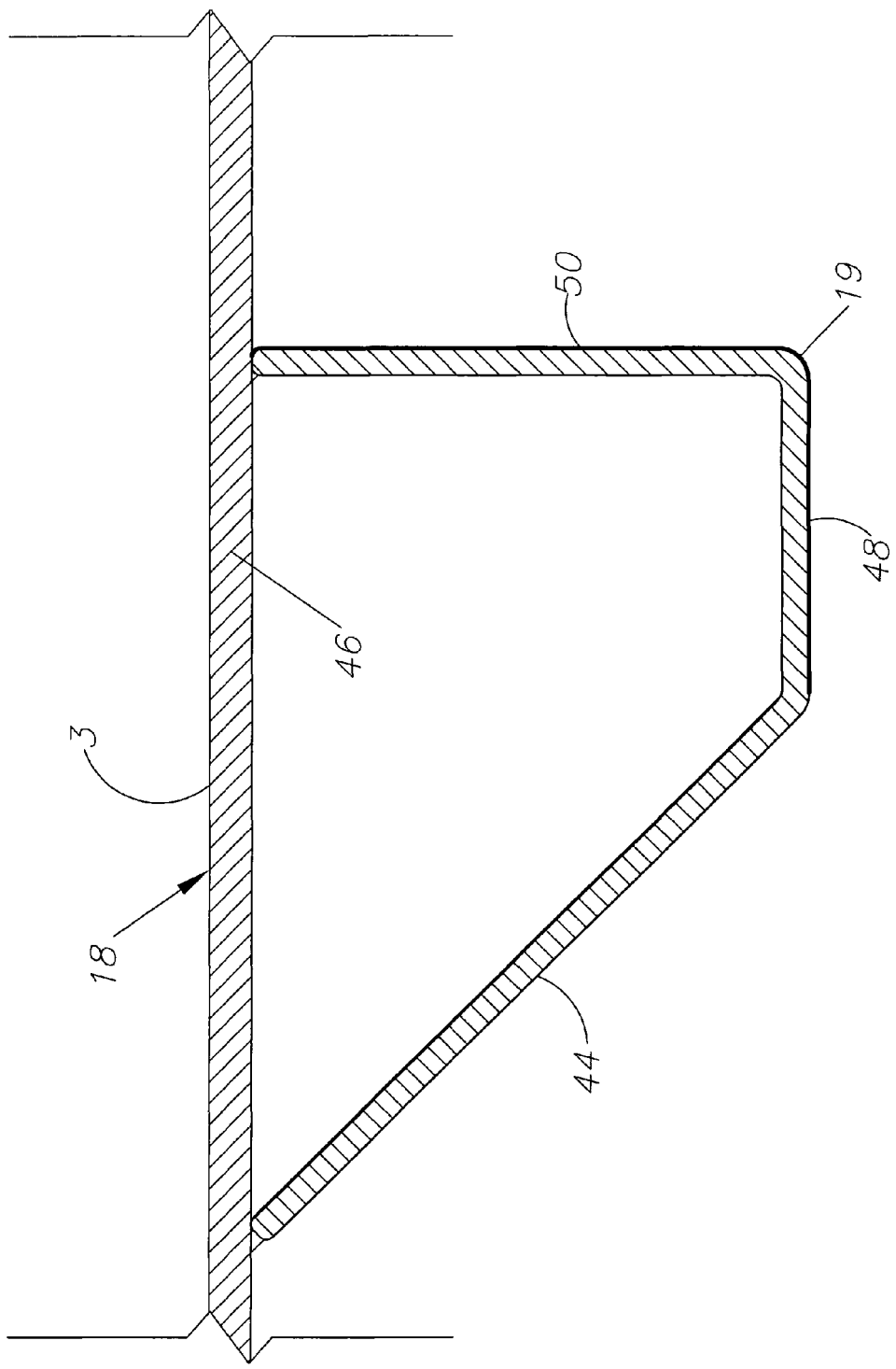

TRAILER, WALL CONSTRUCTION AND MANUFACTURING METHOD

BACKGROUND OF THE INVENTION

1. Field of the Invention

The present invention relates generally to vehicle systems and methods for constructing vehicle walls, and in particular to the construction of trailers for transporting goods and materials. More specifically, the present invention relates to a wall construction comprising interconnected members and methods of constructing vehicle walls by interconnecting extruded members.

2. Description of the Related Art

Vehicles are commonly constructed with enclosed or partially-enclosed interior spaces for receiving cargo and passengers. For example, trailers are constructed in various configurations including flatbed (unenclosed), open-top, fully-enclosed and numerous variations, all according to their intended cargoes, occupancies and uses. The design criteria for enclosed vehicle construction can include strength, weather resistance, aerodynamics and light weight for fuel efficiency, long service life, aesthetics, adaptability to various configurations and economy of construction. Vehicles have previously been constructed using various materials, configurations and construction techniques in order to satisfy these and other design criteria.

A common trailer configuration uses a framework of interconnected, elongated steel or aluminum structural members, which are covered by a suitable skin, such as sheet metal, on the sides and/or top. A bed is constructed for mounting wheels and a trailer hitch, such as a king pin. A superstructure including walls can be mounted on the bed. Vertical ribs can be left exposed or covered for a smooth-side exterior. Extruded panels have also been used for constructing trailers. Examples are shown in U.S. Pat. Nos. 7,014,252; 7,100,972 and No. 7,152,909.

Heretofore there has not been available a trailer, wall construction and manufacturing method with the advantages and features of the present invention.

SUMMARY OF THE INVENTION

In the practice of an aspect of the present invention, a vehicle, such as a trailer, is constructed using multiple, extruded sections for forming walls. Each wall section includes a tongue and a groove adapted for interlocking with an adjacent section or sections. Corners are formed with corner posts adapted for receiving the ends of the sections forming the intersecting walls. Top rails form a rim around the top of the trailer superstructure. Rub rails are provided for interconnecting the walls and a trailer bed. A trailer door at a rear wall of the trailer can be added to enclose the interior cargo space. According to another aspect of the present invention, a wall is constructed using interconnected, extruded sections. According to still another aspect of the present invention, a trailer construction method includes the steps of interconnecting multiple, extruded sections to form a superstructure including walls, and mounting the superstructure on a trailer bed.

BRIEF DESCRIPTION OF THE DRAWINGS

The drawings constitute a part of this specification and include exemplary embodiments of the present invention and illustrate various objects and features thereof.

FIG. 8 is an enlarged, vertical, cross-sectional view of a floor thereof showing a crossbeam.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

II. Trailer Embodiment

Figure 1:
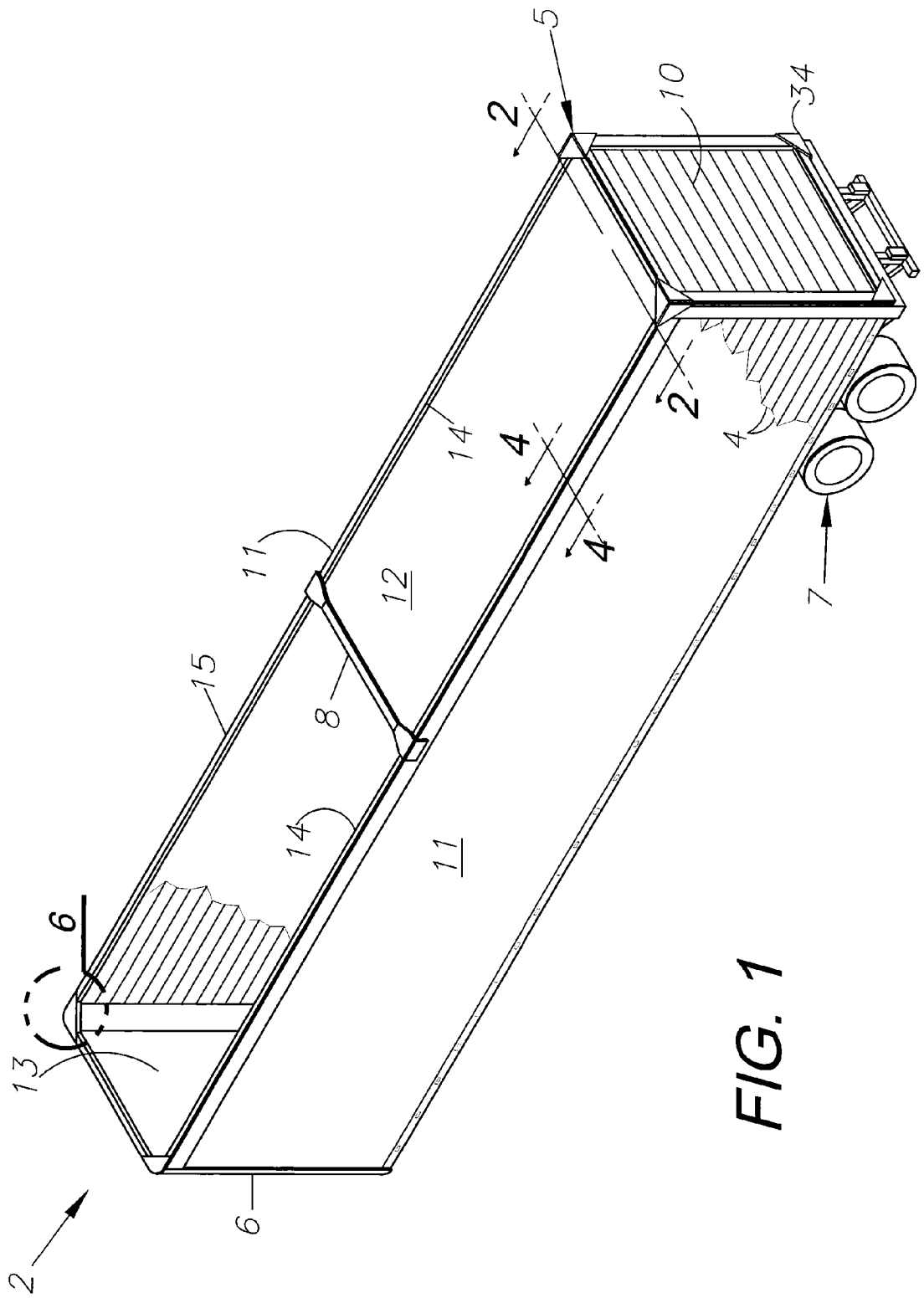
FIG. 1 is a top-down, isometric view of a trailer embodying an aspect of the present invention.
Figure 2:
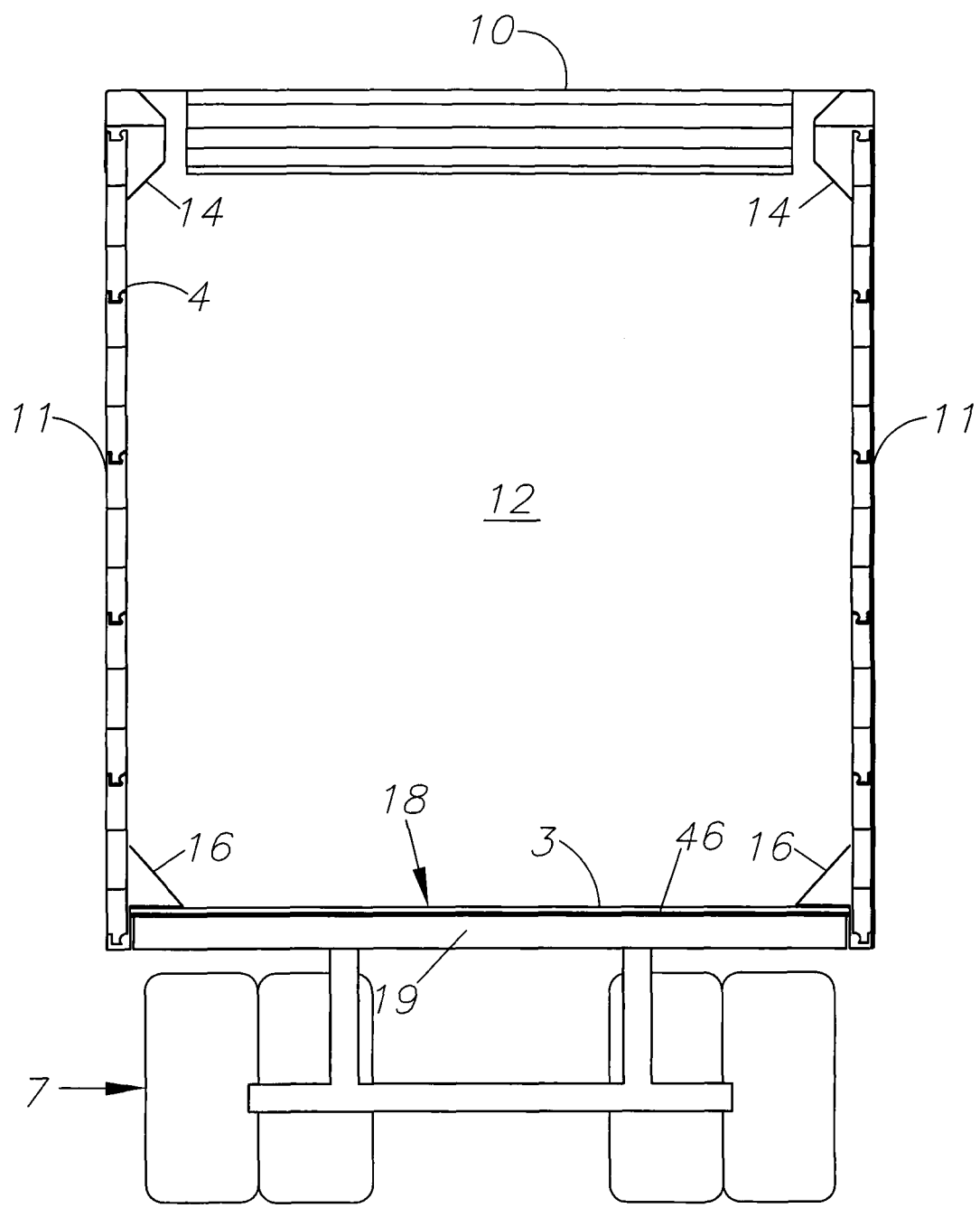
FIG. 2 is a vertical cross-section thereof taken generally along line 2-2 in FIG. 1.
Figure 3:
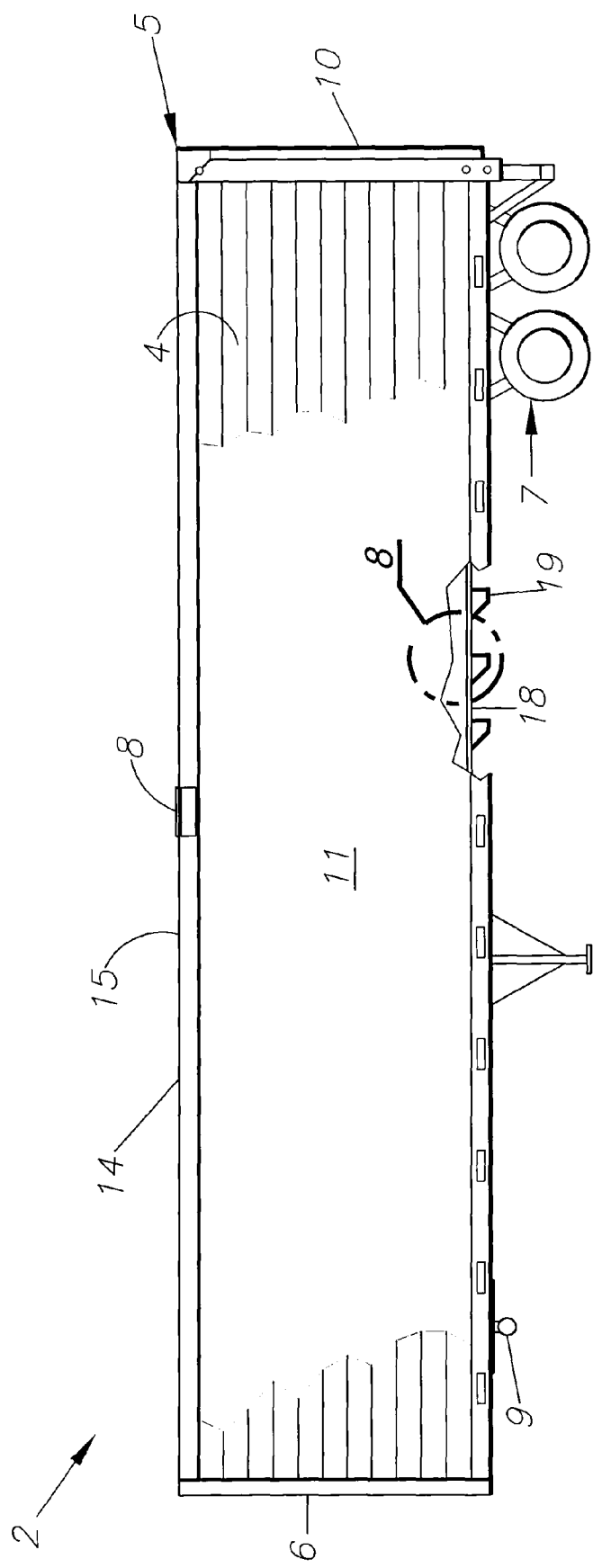
FIG. 3 is a side elevation thereof.

Referring to FIG. 1, the reference numeral 2 generally designates a trailer embodying an aspect of the invention. The trailer 2 generally includes a bed 3 mounting a superstructure 5. The bed 3 mounts a wheel truck 7 and a king pin hitch 9, and includes a floor structure 18. The superstructure 5 includes sidewalls 11, a front wall 13 and an optional rear door 10 in a rear wall 34. Without limitation on the generality of useful trailer configurations embodying the present invention, the trailer 2 shown has an open-top configuration forming an interior 12 for receiving cargo. A cross brace 8 connects the sidewalls 11 at an upper rim 15 of the superstructure 5. Alternatively, the superstructure 5 could be provided with a roof or a removable cover, such as a tarp, for fully-enclosing the interior 12. A rollup-type door 10 is shown, but other types of doors could also be provided at the rear wall 34 and at other locations as required for accessing the interior 12. The superstructure 5 is generally constructed with multiple, horizontal, interconnecting wall sections 4 and corner posts 6 at the wall intersections.

III. Wall Construction

Figure 4:
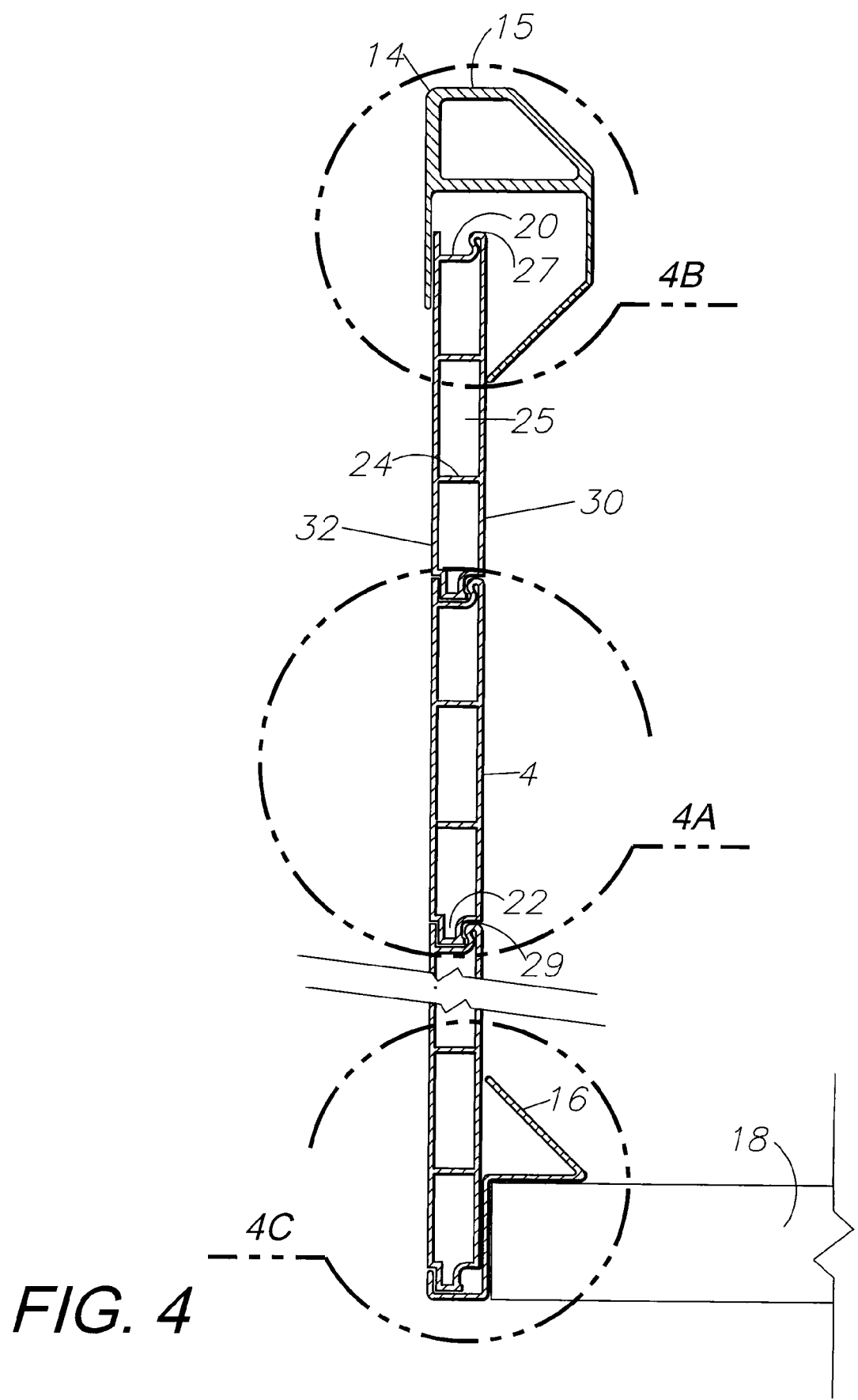
FIG. 4 is a fragmentary cross section of a wall thereof, taken generally along line 4-4 in FIG. 1.
Figure 4A:
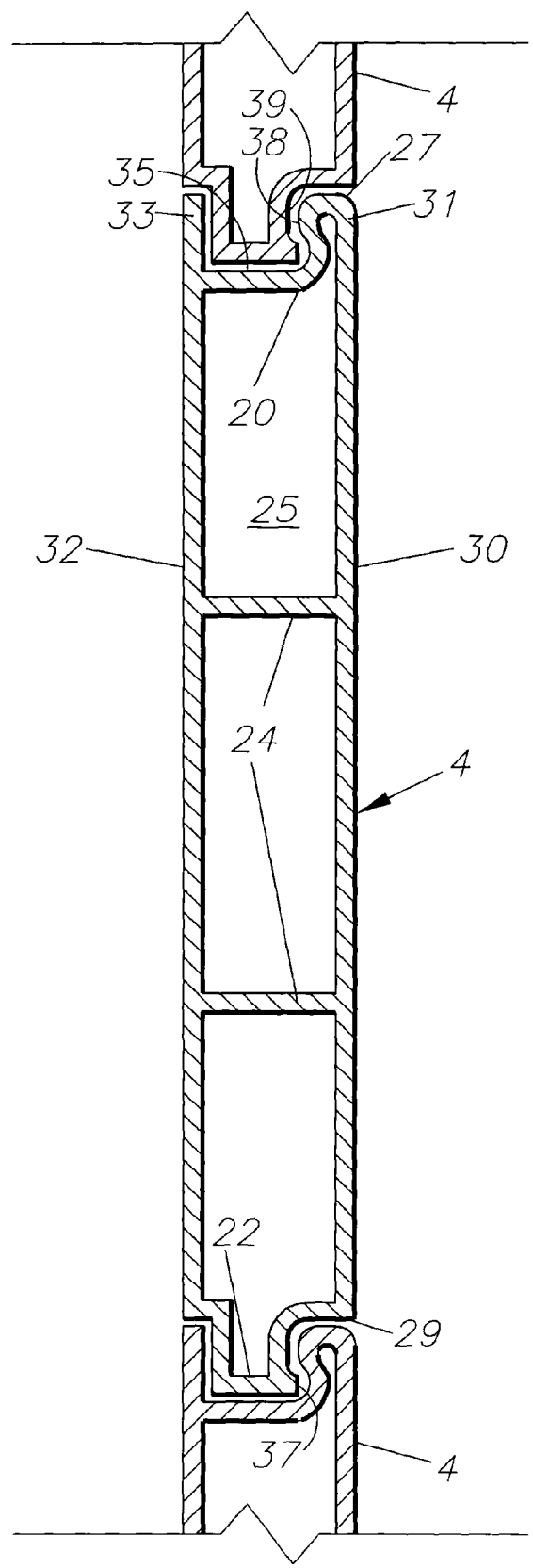
FIG. 4A is an enlarged, fragmentary cross section of the wall, taken generally within circle 4A in FIG. 4.
Figure 6:
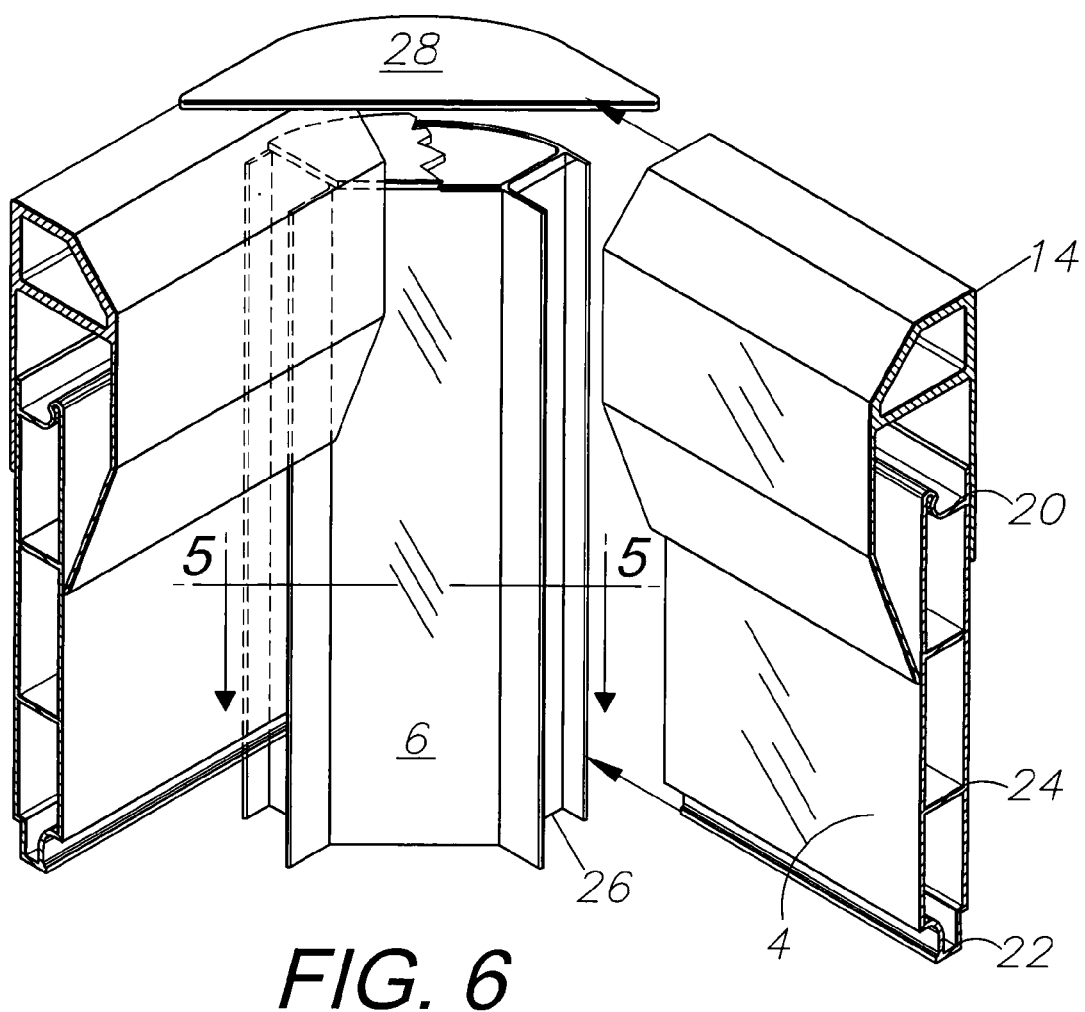
FIG. 6 is an exploded, top-down, isometric view thereof showing the interconnection of wall sections, top rails and a corner post.
Figure 7:
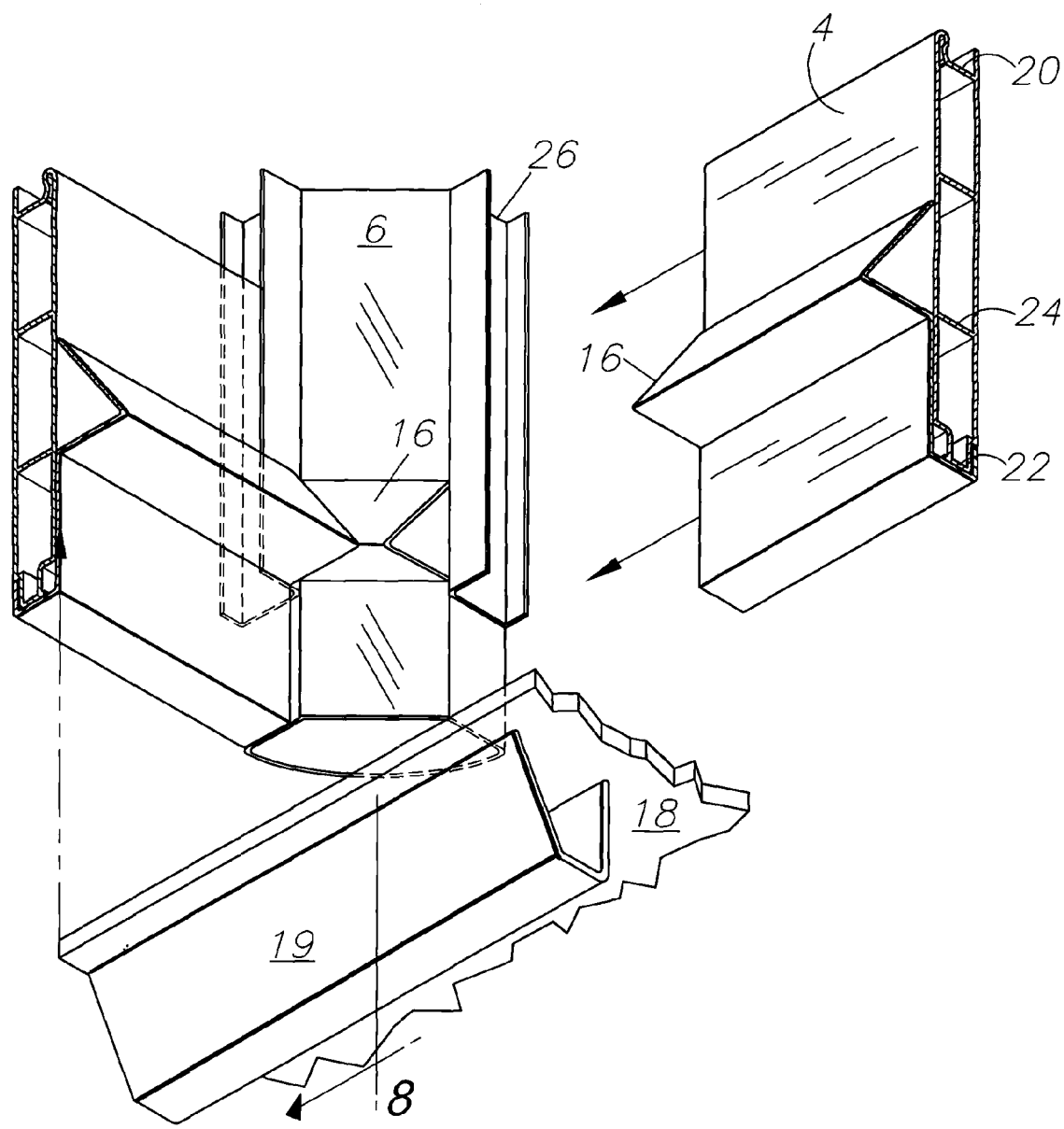
FIG. 7 is an exploded, bottom-up, isometric view thereof showing the interconnection of wall sections, rub rails and a corner post.

As shown in FIGS. 4 and 4A, the wall sections 4 snap together through a top snap connection or groove 20 and a bottom snap connection or tongue 22 to form the walls 11 and 13. Top rails 14 are connected to the top-most wall sections 4 and form the superstructure upper rim 15. Rub rails 16 are connected to the bottom-most wall sections 4 and the floor structure 18. The top rails 14 and the rub rails 16 are also connected to the corner posts 6 as shown in FIGS. 6 and 7. The superstructure 5 components can be welded, glued, or connected together with any suitable fastening technique, including press-fit and mechanical fasteners. For example and without limitation, the wall sections 4 can be secured together by a suitable adhesive, by welding or simply by snap-fitting together. Likewise and without limitation, the top and rub rails 14, 16 and the corner posts 6 can be welded, glued or mechanically fastened (e.g., rivets, screws, bolts, etc.) together. Different fastening techniques can be used for different sets of components of the superstructure 5, as appropriate for accommodating different dynamic stress and load conditions and other considerations.

Figure 5:
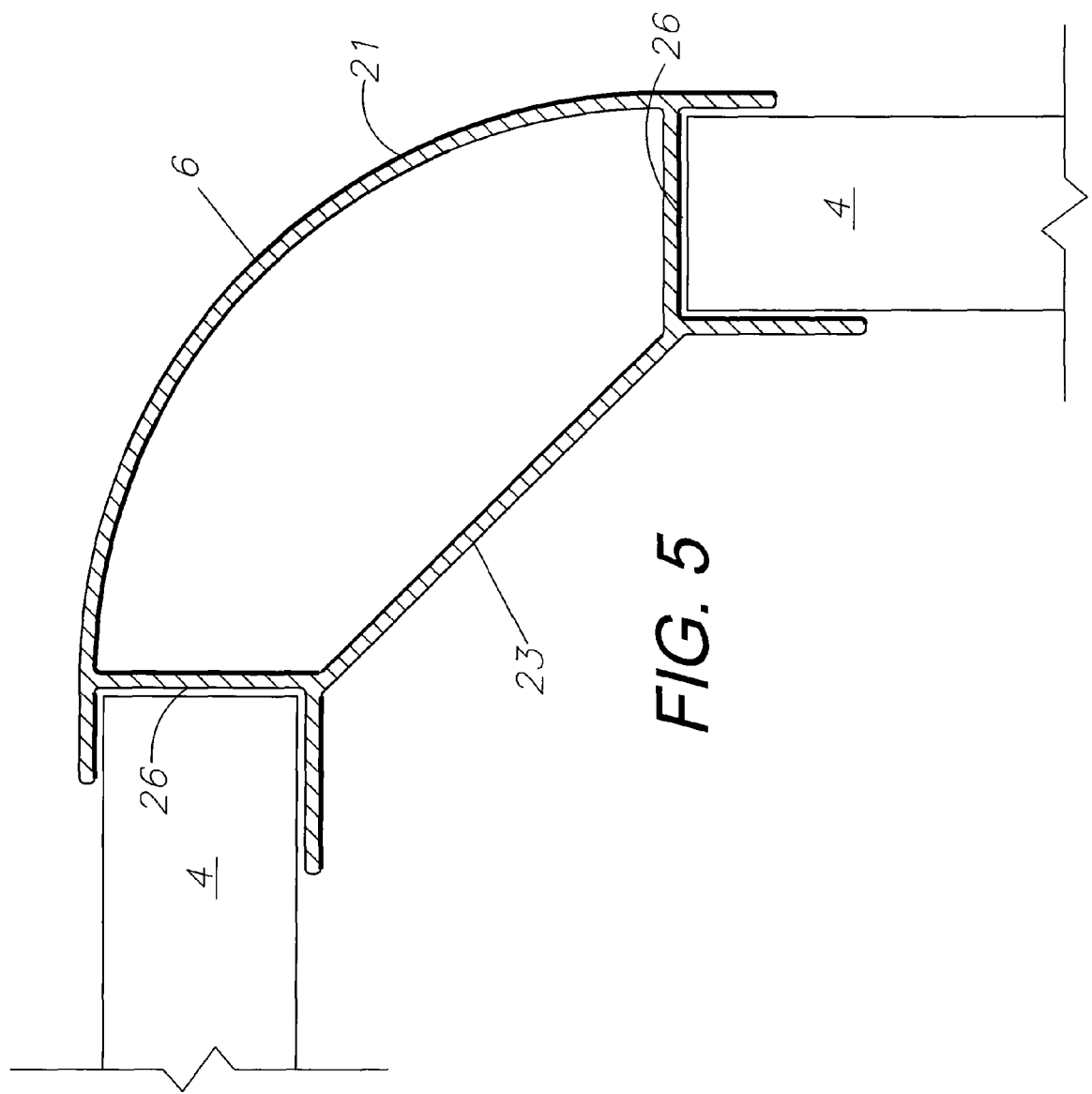
FIG. 5 is an enlarged, horizontal cross section of a corner post thereof taken generally along line 5-5 in FIG. 6.

As shown in FIG. 5, each corner post 6 includes a pair of wall channels 26 which receive ends 17 of the wall sections 4. The corner post 6 is capped with a corner cap 28 which sits atop the top rail 14 and seals off the corner post 6 (FIG. 6). The corner post 6 includes a radiused, outer wall 21 and an inner wall 23 extending at an angle of approximately 45° between the wall channels 26, which are oriented at an angle of approximately 90° with respect to each other for forming a right-angle corner with a side wall 11 at the front or rear of the trailer 2.

As shown in FIG. 4, the wall sections 4 can be interlocked using their tongue-and-groove configurations to create the walls 11 and 13. Each wall section 4 includes a first or inner wall face 30 and a second or outer wall face 32, although these orientations could be reversed. Each wall section also includes multiple (e.g., two) internal spacers 24 extending between the faces 30, 32 and defining multiple, enclosed, longitudinally-extending hollow compartments 25. The wall section grooves 20 are located at a first or upper wall section edge 27 and are shown with upwardly-open orientations. The tongues 22 are located at a second or lower wall section edge 29 and are shown depending downwardly, although these orientations could be reversed. The top snap connection groove 20 is formed by a first upper extension 31 of the inner wall face 30 and by a second upper extension 33 of the outer wall face 32. The first upper extension 31 includes a double thickness of material forming a ridge 38 protruding inwardly into the groove 20. A groove base 35 extends between the extensions 31, 33 and provides a lower closure for the groove 20 and an upper closure for the upper wall section compartment 25.

The tongue 22 is recessed from the wall section faces 30, 32 and has a cross-sectional configuration corresponding to the groove 20 with a lip 37 forming a channel 39 for receiving the ridge 38 of a respective tongue 22 in a snap-together, retained relationship (FIG. 4A) with the wall section faces 30, 32 generally flush. The wall section tongues 22 and grooves 20 can be dimensioned for secure, snapped-together interconnections whereby entire walls 11, 13 can be constructed with or without additional fastening means. Other tongue-and-groove or interconnecting wall section configurations can be used.

Figure 4B:
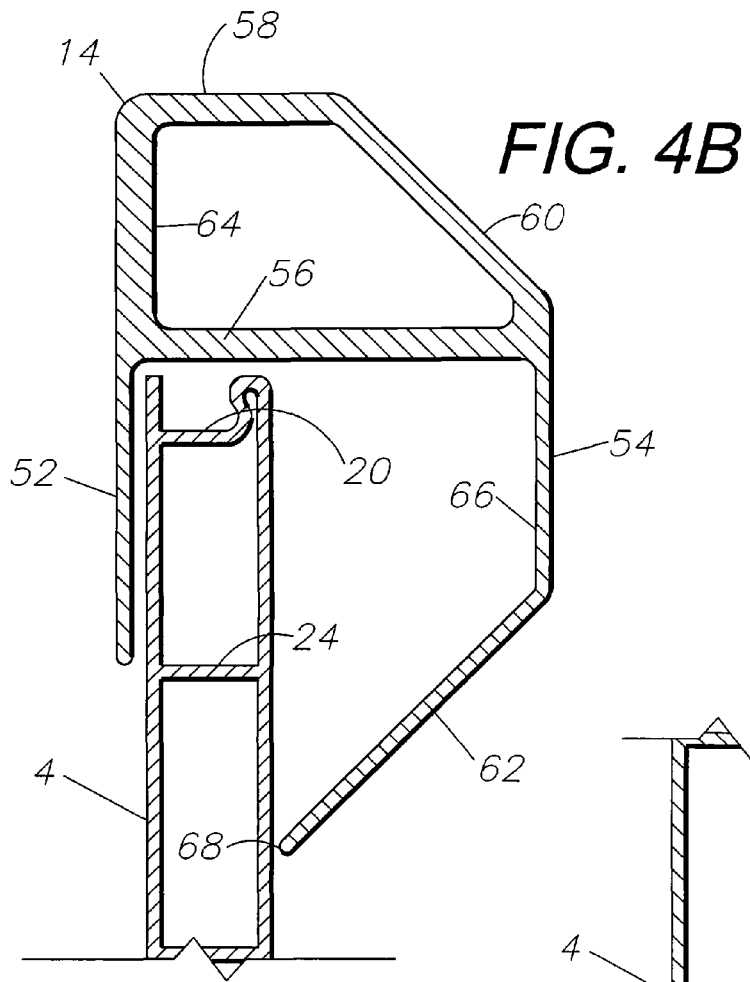
FIG. 4B is an enlarged, fragmentary cross section of a top rail of the wall, taken generally within circle 4B in FIG. 4.

As shown in FIG. 4B, each top rail 14 includes: a first or outer face 52; a second or inner face 54; a top rail spacer 56 connecting the faces 52, 54; a top panel 58; an upper beveled face 60; and a lower beveled face 62. Upper and lower top rail hollow chambers 64, 66 are formed above and below the spacer 56 respectively. The lower top rail chamber 66 is downwardly-open through a passage 68 between the outer face 52 and the lower beveled face 62. The lower chamber 66 receives the top-most wall section 4, which extends partly into the lower chamber 66. The top rails 14 intersect at their ends with the corner posts 6, as shown in FIG. 6.

Figure 4C:
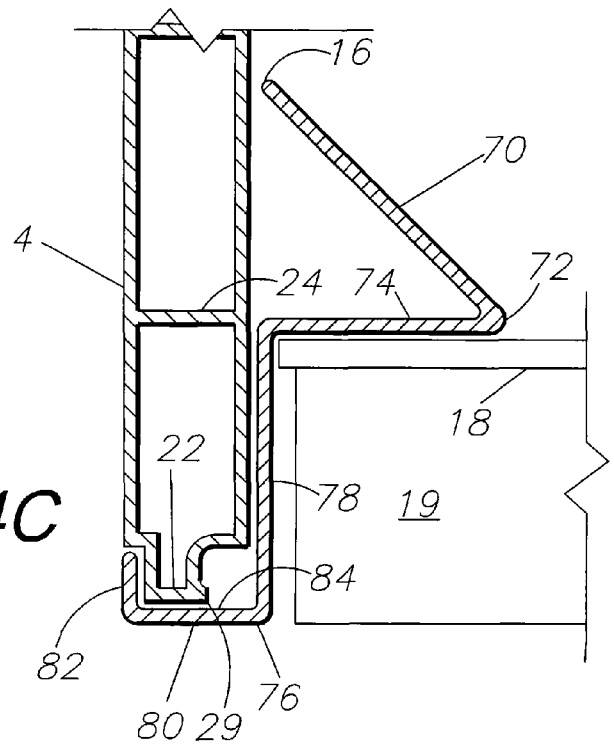
FIG. 4C is an enlarged, fragmentary cross section of a rub rail of the wall, taken generally within circle 4C in FIG. 4.

As shown in FIG. 4C, each rub rail 16 includes an upper portion 70 with a beveled face 72 extending between the lower-most wall section 4 and the floor 18. A horizontal face 74 overlies the floor 18. A channel-shaped lower portion 76 includes an inner face 78 located adjacent to an edge of the floor 18, a bottom spacer 80 and an outer lip 82. The lower portion forms an upwardly-open channel 84, which receives the tongue 22. The rub rail 16 securely mounts the walls 11, 13 on the floor structure 18 by mechanical fasteners, welding, adhesive, etc.

IV. Floor Structure 18

The floor structure 18 includes multiple crossbeams 19 extending transversely with respect to the trailer bed 3 and each having a configuration as shown in FIG. 8 with a front leg 44 extending downwardly and rearwardly from a deck 46 for improved aerodynamics because the streamlined slope of the leg 44 offers less wind resistance than a vertical leg. A crossbeam base 48 is generally horizontal and a rear leg 50 extends generally vertically and connects to the floor deck 46. The flooring for the trailer 2 can be of any type or variety. A solid floor deck 46 can be placed atop the crossbeams 19, as shown in FIG. 8.

V. Construction and Operation.

The trailer 2 can be alternatively configured for various tasks. For example, moving floors have slats driven by hydraulics for conveying material along their surfaces to facilitate loading and unloading operations. Such moving floors are available from Keith Mfg. Co. of Madras, Oreg. under its trademark Walking Floor®. Ejectors are also available for installing in trailer interiors and include hydraulic rams for forcibly ejecting the trailer contents. A dump trailer configuration accommodates tipping the superstructure 5 and the floor 18 at an incline to discharge the contents. Such alternative constructions and discharge schemes accommodate certain types of operations, particularly those involving bulk materials such as grain, gravel, refuse, scrap metal, etc. The floor 18 and the crossbeams 19 can be configured in multiple ways and only a basic configuration is shown in the drawings.

The trailer 2 can be efficiently constructed using the components discussed above. For example, the wall sections 4 tend to snap and/or glue together relatively quickly to form the walls 11, 13. The wall sections 4, the corner posts 6 and the rails 14, 16 can be extruded in various configurations and dimensions from aluminum or some other suitable material. Moreover, the components and the construction method of the present invention accommodate scaling whereby trailers of various sizes and configurations can be constructed using stock components.

In operation, the wall sections enhance the aerodynamic properties of the trailer 2 by providing a relatively smooth outer surface, thus avoiding wind resistance problems and drag associated with vertical external ribbing. The double-wall construction of the wall sections 4 also tends to be relatively strong and lightweight, further enhancing the favorable performance characteristics of the trailer 2. The inner wall faces 30 tend to absorb cargo impact forces whereby dents are confined to the interior, leaving the exterior with an unblemished, smooth appearance even after relatively rugged use.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A vehicle wall construction, which includes:
    multiple wall sections each including: first and second faces positioned in spaced relation; a wall section cavity between said faces; a first edge with a tongue; a second edge with a groove; and first and second ends;
    said wall sections being fastened together with respective tongues being received in respective grooves of adjacent wall sections;
    a wall formed by said interconnected wall sections;
    two of said walls intersecting to form a corner; and
    a corner post located at said corner and including a pair of vertical channels each receiving multiple said wall section ends of a respective wall.

2. The wall construction according to claim 1 wherein said corner post includes:
    a radiused, outer wall;
    an inner wall spaced from said outer wall;
    a cavity formed between said inner and outer walls;
    each said corner post channel being connected to said inner and outer walls; and
    said corner post channels and said walls being oriented approximately 90° with respect to each other.

3. The wall construction according to claim 1 wherein:
    each said tongue includes one of a ridge and a channel;
    each said groove includes the other of a ridge and a channel; and
    said ridges are adapted to snap into said channels with said tongue received in said groove.

4. The wall construction according to claim 1 wherein said wall section tongues are fastened in said wall section grooves by fastening means chosen from among the group consisting of adhesive, welding, press-fit and mechanical fasteners.

5. A trailer, which comprises:
    a bed including a floor structure comprising multiple crossbeams extending transversely in spaced, juxtaposed relation and a floor deck mounted on said crossbeams;
    a king pin hitch mounted on said bed;
    a wheel truck mounted on said bed;
    a superstructure mounted on said bed and enclosing an interior, said superstructure comprising a pair of sidewalls, a front wall, a rear wall with a door opening, a door movable between open and closed positions with respect to said rear wall door opening; a top rail mounted on top of said walls and forming an upper rim of said superstructure; a rub rail connecting said walls with said floor structure; and corner posts forming corner intersections of said sidewalls and said front wall;
    said sidewalls and said front wall each comprising multiple, horizontal wall sections including: first and second faces; multiple spacers extending between said faces and forming corresponding wall section hollow compartments; first and second ends; a first edge with a groove; and a second edge with a tongue;
    each said corner post including a pair of channels oriented at approximately 90° with respect to each other and receiving respective wall section ends at an intersection of adjacent walls;
    said top rail including a chamber and a passage open upwardly into said chamber;
    top-most wall sections of said sidewalls and said front wall extending through said top rail passage and into said compartment thereof;
    said rub rail including a channel receiving the tongue of the bottom-most wall sections of said sidewalls and said front wall;
    said rub rail being connected to said sidewalls, said front wall and said floor structure; and
    said wall sections, corner posts, top rail and rub rail being connected by one or more of the fastening means chosen from among the group comprising adhesive, welding, snap-fit and mechanical fasteners.

6. The trailer according to claim 5, which includes:
    each said floor structure crossbeam having a front leg attached to said floor deck, a rear leg attached to said floor deck and a bottom leg connected to said front and rear legs and located in spaced relation below said floor deck; and
    said front leg having a configuration angled upwardly and forwardly from said bottom leg to said floor deck.

7. The trailer according to claim 5, which includes a discharge system chosen from among the group comprising a moving floor, a tipping bed and superstructure and an ejector mechanism.

8. A method of manufacturing a trailer, which comprises the steps of:
    providing a bed with a floor structure including multiple cross members extending transversely across said bed and a floor plate mounted on said cross members;
    providing a superstructure mounted on said bed and including a pair of sidewalls, a front wall and a rear wall;
    enclosing a superstructure interior with said walls and said floor structure;
    constructing each said wall with multiple, horizontal wall sections each having a first edge with a tongue and a second edge with a groove;
    inserting said wall section tongues in said wall section grooves to connect the wall sections associated with each wall;
    providing multiple corner posts with pairs of corner post channels oriented at approximately 90° angles;
    locating said corner posts at corners of said superstructure;
    inserting said wall section ends into the corner post channels; and
    forming intersections of said walls at said superstructure corners.

9. The method according to claim 8, which includes the additional steps of:
    forming a double-thickness extension of each said wall section second face at said groove;
    forming a ridge with said extension and projecting said ridge into said groove;
    forming a channel along each said tongue; and
    snap-fitting multiple said tongues into a respective grooves with said channels receiving said ridges.

10. The method according to claim 8, which includes the additional steps of:
    providing said superstructure with an upper rim;
    providing each said wall with a top rail at said upper rim;
    providing each said top rail with a chamber and a downwardly-open passage into said chamber; and extending an edge of the top-most wall section of each said wall through a respective passage and into a respective chamber.

11. The method according to claim 8, which includes the additional steps of:
providing each said wall with a bottom rail;
providing each said bottom rail with an upwardly-open bottom rail channel, a horizontal extension and a bottom rail beveled leg extending at an angle upwardly and outwardly from said extension;
extending a respective edge of the bottom-most wall section of each wall into said bottom rail channel; and
mounting said bottom rail extension on said floor structure.

12. The method according to claim 8, which includes the additional steps of:
providing each said floor structure cross member with a front leg; and
angling each said cross member front leg downwardly and rearwardly from said floor panel.

13. The method according to claim 8, which includes the additional steps of extruding said wall sections, corner posts, top rail and rub rail.

14. A vehicle wall construction, which includes:
multiple wall sections each including: first and second faces positioned in spaced relation; a wall section cavity between said faces; a first edge with a tongue; a second edge with a groove; and first and second ends;
said wall sections being fastened together with respective tongues being received in respective grooves of adjacent wall sections;
a wall formed by said interconnected wall sections;
each said tongue includes one of a ridge and a channel;
each said groove includes the other of a ridge and a channel;
said ridges are adapted to snap into said channels with said tongue received in said groove;
each said wall section groove is defined by a double-thickness extension of said first face and a single-thickness extension of said second face;
said extensions are adapted to receive a respective tongue therebetween;
said double-thickness second face extension forming said ridge; and
a spacer extending between said extensions and forming a base of said groove.

15. The wall construction according to claim 14, which includes:
said tongue being recessed at said first and second wall section faces for receiving said extensions of an adjacent wall section whereby said wall section faces are substantially flush.

16. A vehicle wall construction, which includes:
multiple wall sections each including: first and second faces positioned in spaced relation; a wall section cavity between said faces; a first edge with a tongue; a second edge with a groove; and first and second ends;
said wall sections being fastened together with respective tongues being received in respective grooves of adjacent wall sections;
a wall formed by said interconnected wall sections;
a top rail including a chamber and a passage open upwardly into said chamber;
a top-most wall section of said wall extending through said passage and into said chamber; and
said top rail forming an upper rim of said wall construction.

17. The wall construction according to claim 16 wherein said top rail includes:
first and second top rail faces;
a top rail spacer extending between said top rail first and second faces;
said chamber comprising a lower top rail chamber located below said spacer;
an upper top rail chamber located above said spacer;
a top panel located above said upper chamber;
an upper beveled face extending from said top panel to said second face; and
a lower beveled face extending from said second face to said passage.

18. A vehicle wall construction, which includes:
multiple wall sections each including: first and second faces positioned in spaced relation; a wall section cavity between said faces; a first edge with a tongue; a second edge with a groove; and first and second ends;
said wall sections being fastened together with respective tongues being received in respective grooves of adjacent wall sections;
a wall formed by said interconnected wall sections;
a rub rail including a channel receiving the tongue of a bottom-most wall section; and
said rub rail being adapted for connection to a vehicle floor structure.

19. The wall construction according to claim 18 wherein said rub rail includes:
a rub rail inner face located adjacent to the first face of said bottom-most wall section;
a lip located adjacent to the second face of said bottom-most wall section;
a bottom spacer extending between said rub rail first face and said lip and closing said rub rail channel;
a horizontal face extending inwardly from said rub rail first face; and
a beveled rub rail face extending between a respective wall section first face and said horizontal face extension.

* * * * *